(12) United States Patent
Becker et al.

(10) Patent No.: US 12,497,237 B2
(45) Date of Patent: Dec. 16, 2025

(54) BLOCK STACKING ARRANGEMENT

(71) Applicant: Jungheinrich Aktiengesellschaft, Hamburg (DE)

(72) Inventors: Michael Becker, Hainburg (DE); Jörg Cavelius, Bad Vilbel (DE); Timm Morawietz, Tholey-Überroth (DE); Adrian Nowack, Mainz (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 388 days.

(21) Appl. No.: 18/115,347

(22) Filed: Feb. 28, 2023

(65) Prior Publication Data

US 2023/0278788 A1 Sep. 7, 2023

(30) Foreign Application Priority Data

Mar. 3, 2022 (EP) .................................... 22159996

(51) Int. Cl.
*B65G 1/04* (2006.01)
*B65D 21/02* (2006.01)
*B65G 1/14* (2006.01)

(52) U.S. Cl.
CPC ....... *B65G 1/0471* (2013.01); *B65D 21/0215* (2013.01); *B65G 1/14* (2013.01); *B65G 2201/025* (2013.01)

(58) Field of Classification Search
CPC ...... B65G 1/0471; B65G 57/302; B65G 1/14; B65G 57/301; B65G 57/30; B65G 59/062; B65G 59/066
See application file for complete search history.

(56) References Cited

U.S. PATENT DOCUMENTS

| 8,118,531 B2* | 2/2012 | Watanabe | H05K 13/0439 |
| | | | 269/254 CS |
| 10,059,521 B2* | 8/2018 | Swoboda | B65G 59/101 |
| 11,261,026 B2* | 3/2022 | Cavelius | B65G 57/02 |
| 11,407,561 B2* | 8/2022 | Guindi | B65D 21/0215 |

(Continued)

FOREIGN PATENT DOCUMENTS

| DE | 29904426 U1 * | 7/1999 | B65G 57/303 |
| DE | 198 49 391 | 5/2000 | |

(Continued)

OTHER PUBLICATIONS

Machine translation of DE-29904426-U1 from espacenet. (Year: 1999).*

(Continued)

*Primary Examiner* — Mark C Hageman
(74) *Attorney, Agent, or Firm* — GREENBLUM & BERNSTEIN, P.L.C.

(57) ABSTRACT

A block stacking arrangement that includes a plurality of container receiving slots; a loading space arranged in the direction of gravity below the container receiving slots; a pass-through opening between each of the container receiving slots and the loading space; and a holding device at the pass-through opening, which has at least one holding pawl that is pivotable between a holding position and a release position. The holding pawl has a cutout that, in the holding position, is directed into the pass-through opening.

13 Claims, 3 Drawing Sheets

(56) References Cited

U.S. PATENT DOCUMENTS

| | | | |
|---|---|---|---|
| 11,678,743 B2* | 6/2023 | Cavelius | B65G 59/062 |
| | | | 211/126.6 |
| 11,952,225 B2* | 4/2024 | Harting | B65G 1/14 |
| 2021/0052070 A1* | 2/2021 | Cavelius | A47B 87/0261 |
| 2021/0053760 A1* | 2/2021 | Cavelius | B65G 1/1375 |
| 2021/0053777 A1* | 2/2021 | Harting | B65G 57/302 |
| 2022/0144546 A1* | 5/2022 | Tendo | B66F 9/063 |
| 2024/0092529 A1* | 3/2024 | Austrheim | B65D 7/32 |

FOREIGN PATENT DOCUMENTS

| | | |
|---|---|---|
| EP | 3 782 930 | 2/2021 |
| EP | 3 782 931 | 2/2021 |
| JP | 58-162440 | 9/1983 |
| JP | 2009-40554 | 2/2009 |
| NL | 7 611 143 | 4/1977 |

OTHER PUBLICATIONS

Europe Search Report/Office Action conducted in counterpart Europe Appln, No. 22159996.2 (Sep. 5, 2022).

* cited by examiner

BLOCK STACKING ARRANGEMENT

CROSS-REFERENCE TO RELATED APPLICATION

This application claims priority under 35 U.S.C. § 119(a) to Europe Application No. 22 15 9996.2 filed Mar. 3, 2022, the disclosure of which is expressly incorporated by reference herein in its entirety.

BACKGROUND

1. Field of the Invention

Embodiments are directed to a block stacking arrangement having a plurality of container receiving slots, a loading space arranged in the direction of gravity below the container receiving slots, a pass-through opening between each container receiving slot and the loading space, and a holding device at the pass-through opening, which has at least one holding pawl that is pivotable between a holding position and a release position.

2. Discussion of Background Information

Such a block stacking arrangement is known, for example, from EP 3 782 930 A1.

A block stacking arrangement is also referred to as a "stacking storage arrangement."

In a block stacking arrangement, containers are stored in the form of stacks. The stacks are then each arranged in a container receiving slot. Since the containers are stacked on top of each other, a high packing density in the vertical direction, i.e. in the direction of gravity, and thus good utilization of the available installation space can be achieved. The container receiving slots may be arranged relatively close to one another, such that good utilization of the available space can also be achieved in the horizontal direction.

In the present case, the containers are inserted into the container receiving slots from below and are also removed from the container receiving slots downwardly. For this purpose, the respective container is guided through the pass-through opening between the container receiving slot and the loading space.

In order to hold a stack of containers or even just a single container in the container receiving slot, the holding device is provided, which uses one or more holding pawls to hold the respective lowest container of a stack if the holding pawl is located in the holding position. To be able to remove a container, the container or the stack of containers is initially lifted until the container or the lowermost container of a stack is released from the holding pawl. The holding pawl is then pivoted into the release position and the container can be moved down past the holding pawl in the direction of gravity.

In order to be able to accommodate a larger number of containers in a stack, the holding pawl must engage with the container to a sufficient degree. To provide the necessary contact area of the container on the holding pawl when the holding pawl is located in the holding position, a shape of the container whereby a projection extends into the container interior is necessary. As a result, the container interior cannot be fully utilized, such that, for an object with external dimensions of 600×400 mm, for example a cardboard box of this type, either a container is needed that is correspondingly larger, or the cardboard box cannot be accommodated.

The enlargement of the container interior in turn leads to a non-optimal utilization of the installation space of a block stacking arrangement.

SUMMARY

Embodiments are directed to making good use of the installation space of a block stacking system for storing objects.

According to embodiments, a block stacking arrangement of the type mentioned above, includes a holding pawl having a cutout that, in the holding position, is directed into the pass-through opening.

When the holding pawl is located in the holding position, the container will be able to enter the cutout of the holding pawl. The space thus gained makes it possible to dispense with a formation of the container that projects into the container interior. The container interior thus remains completely free for the accommodation of objects, for example cardboard boxes, even if such objects are cuboid in shape. A cuboid object, such as a cardboard box, can also be inserted into the container and completely fill the container, such that the available installation space can be used optimally.

Preferably, the holding pawl has a pivot axis that encloses an angle of less than 75° with both a longitudinal direction and a transverse direction of the pass-through opening. The holding pawl is thus arranged at a corner of the pass-through opening and can act on the container not only in the longitudinal direction but also in the transverse direction of the pass-through opening.

Preferably, the cutout is formed to be V-shaped. A V-shaped cutout allows the holding pawl to support the container with two "arms," wherein the arms point in different directions. This makes it possible to support the container in the directions of the two arms in a sufficient manner, such that tilting of the container can be prevented.

Preferably, the cutout has two side flanks, whose ends directed into the pass-through opening together enclose an angle in the range of 75° to 105°. Preferably, this angle is approximately 90°, such that the holding pawl can in an optimal manner accommodate a container that has a rectangular footprint.

Preferably, at least one container is arranged in the block stacking arrangement and the cutout is adapted to the shape of a corner geometry of the container. This makes it possible to match the container and the holding pawl in such a way that the holding pawl can sufficiently engage under the container when the holding pawl is located in the holding position, without a formation on the container that projects into the container interior needing to be provided.

Preferably, the container has a container opening, which is surrounded by a container wall, and the corner geometry is arranged at the end of the container wall facing away from the container opening. The container is then supported at its lower end in the direction of gravity, such that the container wall is not loaded by the mass of the stored goods accommodated in the container.

Preferably, the container wall has an offset in the region of the corner geometry. This creates a contact surface on the container, with which it can stand on the holding pawl.

Preferably, the container has a container bottom, and the corner geometry extends in the direction of the container opening at most as far as the container bottom. The corner geometry can then be limited to a "height" that is within the container bottom. Everything arranged above the container bottom can then be formed without interference, such that the entire container interior is available for holding stored goods, which is particularly advantageous if such stored goods are in the form of cuboid cardboard boxes or packages.

Preferably, the container wall has a longitudinal side and a transverse side, which are arranged essentially at right angles to one another and are connected to one another by a connecting wall that is arranged between the corner geometry and the container opening and encloses in each case an angle of at most 150° with the longitudinal side and the transverse side. Preferably, the connecting wall encloses in each case an angle of approximately 135° with the longitudinal side and the transverse side. The connecting wall is arranged diagonally, so to speak, to the longitudinal side and the transverse side. This makes it possible to ensure that there is a wall located directly above the holding pawl that is capable of absorbing even greater loads that result, for example, when a stack with a large number of containers is accommodated in the container receiving slot.

Preferably, the holding pawl in the release position is recessed in a depression of a guide element. The holding pawl thus does not project in the release position, but forms a largely smooth surface with the guide element, such that, when a container is lifted or lowered through the pass-through opening, no snagging of the container can occur. This increases the operational reliability of the block stacking arrangement.

Preferably, the guide element has a contour that is adapted to the shape of the connecting wall. The contour does not have to be identical to the shape of the connecting wall. The contour can be at some distance from the connecting wall when the container moves through the pass-through opening. However, the guide element can provide some positioning of the container, such that a transfer of the container to a loading vehicle traveling in the loading space can be facilitated.

Preferably, the guide element has an insertion chamfer on its upper side in the direction of gravity and/or on its lower side in the direction of gravity. The insertion chamfer is slightly beveled such that the introduction of a container into the pass-through opening is facilitated.

Embodiments are directed to a block stacking arrangement that includes a plurality of container receiving slots; a loading space arranged in the direction of gravity below the container receiving slots; a pass-through opening between each of the container receiving slots and the loading space; and a holding device at the pass-through opening, which has at least one holding pawl that is pivotable between a holding position and a release position. The holding pawl has a cutout that, in the holding position, is directed into the pass-through opening.

According to embodiments, the holding pawl can have a pivot axis that encloses an angle of less than 75° with both a longitudinal direction and with a transverse direction of the pass-through opening.

In accordance with embodiments, the cutout may be formed to be V-shaped.

In other embodiments, the cutout may have two side flanks, whose ends directed into the pass-through opening together enclose an angle in the range of 75° to 105°.

In accordance with still yet other embodiments, the block stacking arrangement may further include at least one container positionable within the block stacking arrangement and the cutout can be adapted to the shape of a corner geometry of the container. The container may have a container bottom, and the corner geometry extends in the direction of the container opening at most as far as the container bottom. Further, the container bottom may be located between the container opening and the corner geometry. Still further, the container can have a container opening, which is surrounded by a container wall, and the corner geometry is arranged at an end of the container wall facing away from the container opening. The container wall may have an offset in a region of the corner geometry. Additionally or alternatively, the container wall may have a longitudinal side and a transverse side, which are arranged substantially at right angles to one another and are connected to one another by a connecting wall that is arranged between the corner geometry and the container opening and encloses in each case an angle of at most 150° with the longitudinal side and the transverse side. Moreover, the block stacking arrangement can include a guide element and the holding pawl in the release position can be recessed in a depression of the guide element. The guide element can have a contour that is adapted to the shape of the connecting wall. The guide element may have an insertion chamfer on at least one of an upper side in the direction of gravity and/or a lower side in the direction of gravity.

Other exemplary embodiments and advantages of the present invention may be ascertained by reviewing the present disclosure and the accompanying drawing.

BRIEF DESCRIPTION OF THE DRAWINGS

The invention is described below with reference to a preferred exemplary embodiment in conjunction with the drawing. The following are shown therein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
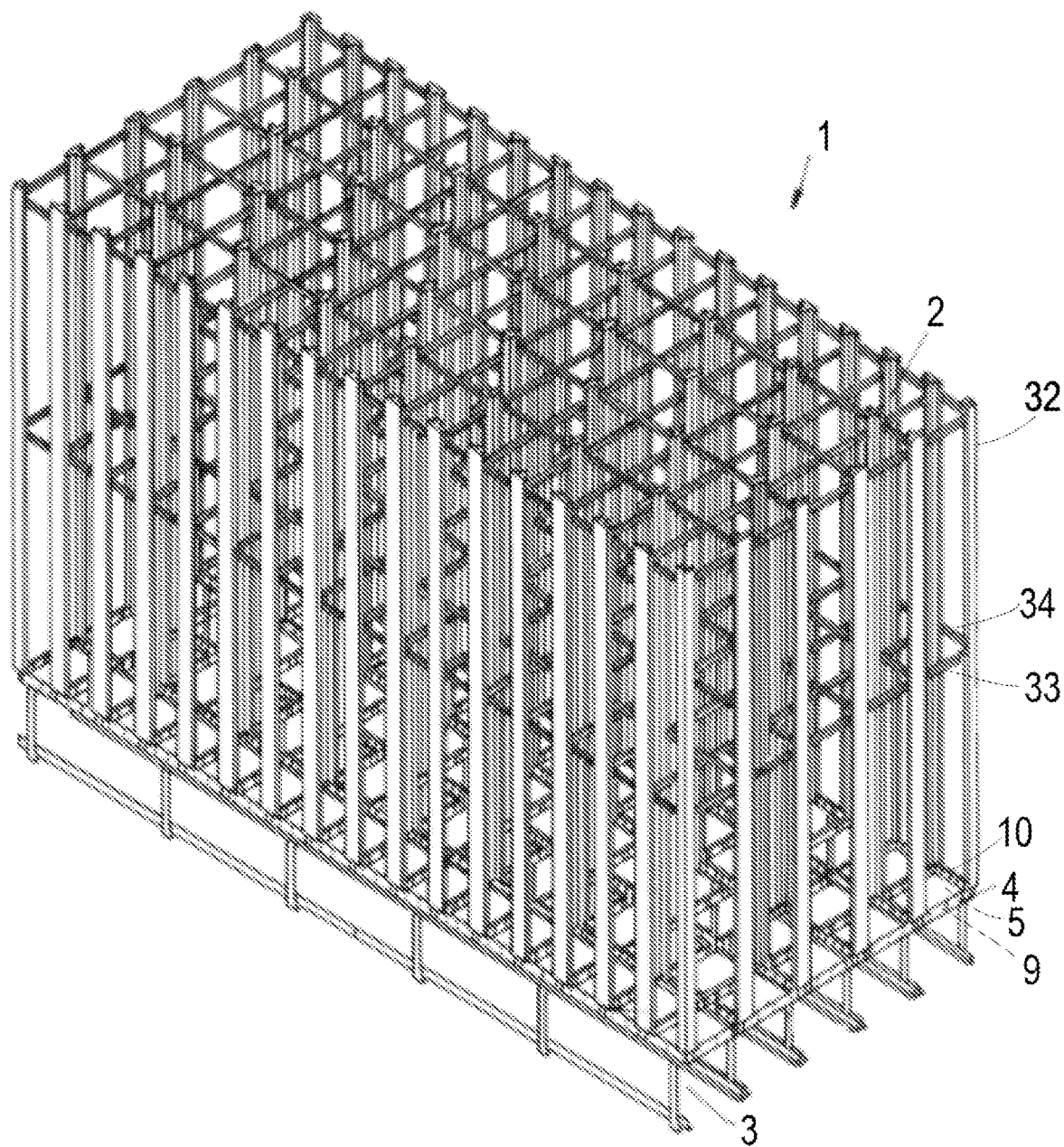
FIG. 1 is a schematic illustration of a block stacking arrangement.

FIG. 1 shows in highly schematized form a block stacking arrangement 1 with a plurality of container receiving slots 2 arranged in the form of rows side by side and in the form of columns one behind the other. The container receiving slots 2 are thus arranged in a matrix-like manner. Each container receiving slot 2 can hold one container or a stack of a plurality of containers.

A loading space 3 is located below the container receiving slots 2 in the direction of gravity. A frame assembly 4 is arranged between the container receiving slots 2 and the loading space 3, which frame assembly has a pass-through opening 5 for each container receiving slot 2. The pass-through opening 5 is formed such that a container 6 (FIGS. 4 and 5) can be moved from the loading space 3 into the container receiving slot 2 or can be moved from a container receiving slot 2 into the loading space 3 through the pass-through opening 5.

A holding device 7 (FIG. 2) is arranged at each pass-through opening 5. The holding device 7 has at least one holding pawl 8, which can be pivoted between a holding position shown in FIGS. 2 and 3 and a release position. In the holding position, it can hold a container 6 in place. In the release position, the pass-through opening 5 is free for the passage of a container 6.

Figure 2:
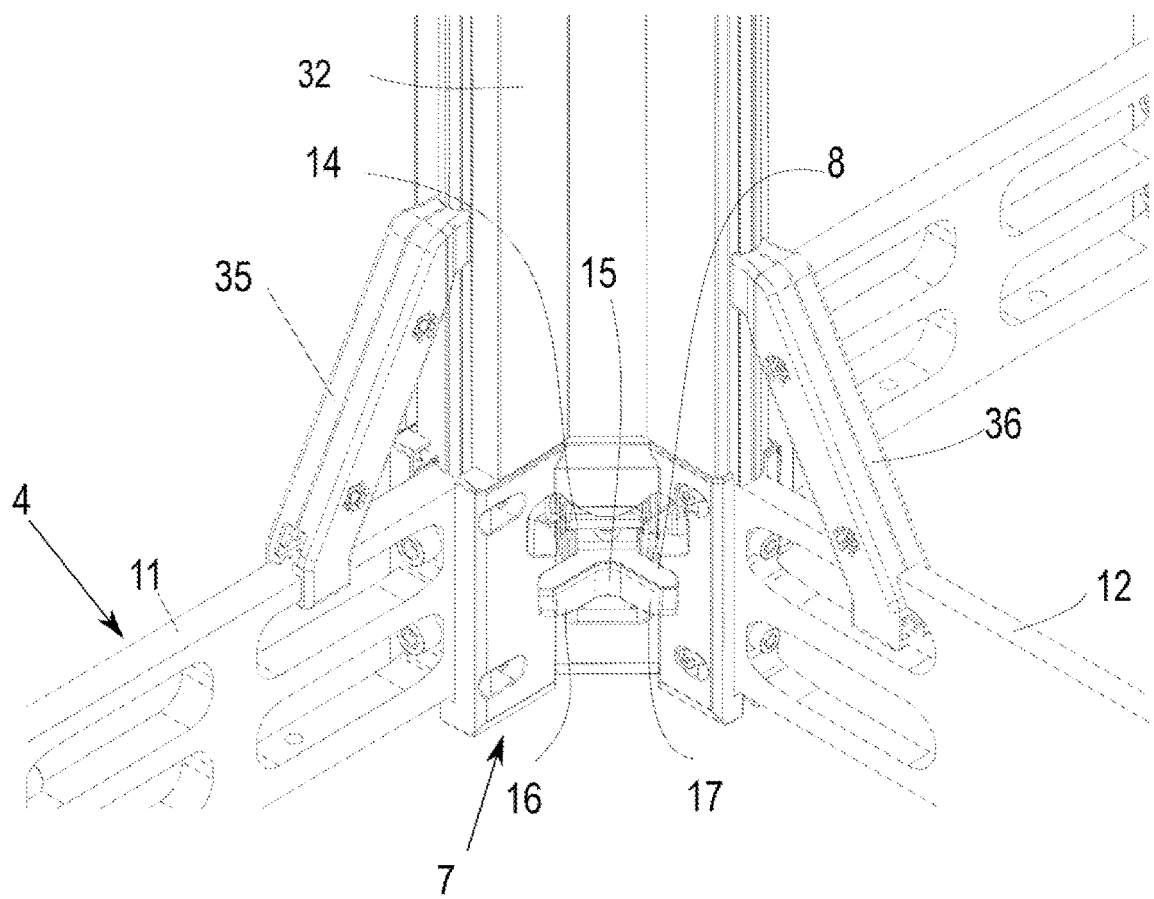
FIG. 2 is a part of a pass-through opening of the block stacking arrangement.
Figure 3:
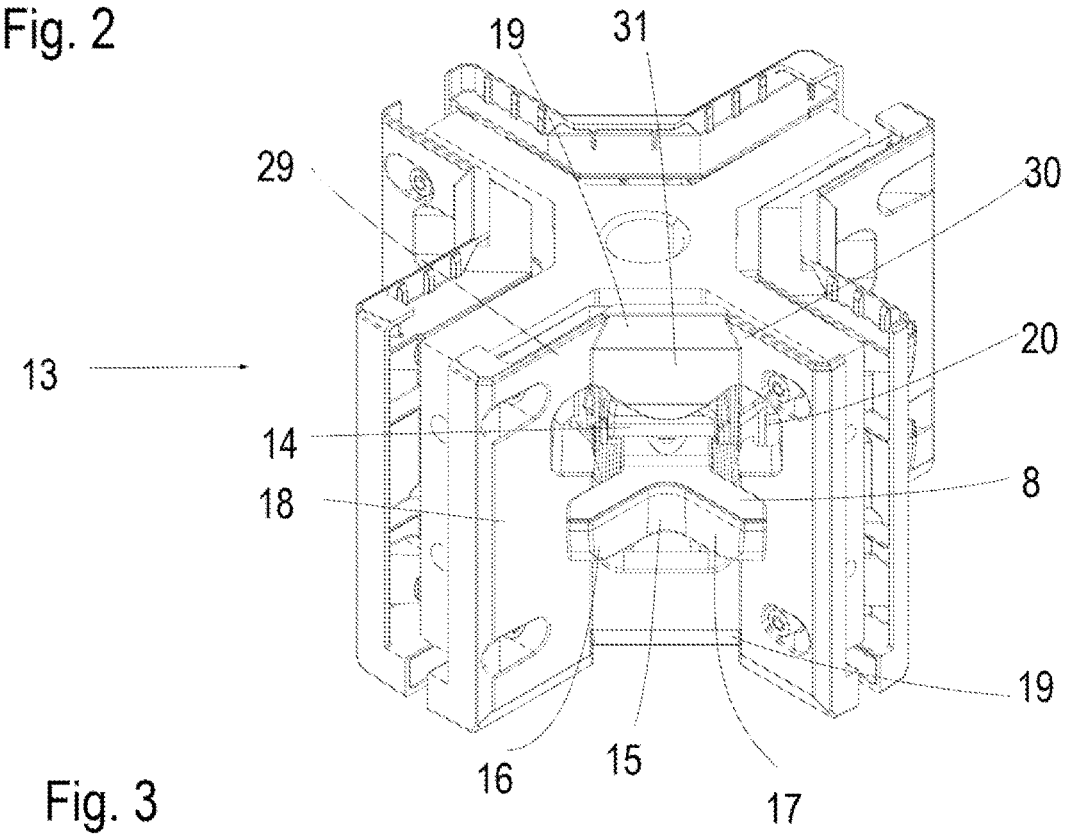
FIG. 3 is a corner connector with a holding pawl.

The pass-through opening 5 has two longitudinal beams 11 on its longitudinal side 9, one of which is shown in FIG. 2. Furthermore, the pass-through opening 5 has two cross-beams 12 on its transverse side 10, one of which is also shown in FIG. 2. A longitudinal beam 11 and a cross-beam 12 are connected to one another by a corner connector 13 (FIG. 3). The holding pawl 8 is arranged in the corner connector 13.

The holding pawl 8 has a pivot axis 14 that encloses an angle of less than 75° with both the longitudinal side 8 and the transverse side 10. Preferably, the pivot axis 14 encloses an angle of approximately 45° with both the longitudinal side 9 and the transverse side 10.

The holding pawl 8 has a cutout 15 that is directed into the pass-through opening 5 in the holding position (FIGS. 2 and 3). The cutout 15 is formed to be V-shaped. The cutout 15 has a first side flank 16 and a second side flank 17. At least the ends of the side flanks 16, 17 pointing into the pass-through opening 5 together enclose an angle in the range of 75° to 105°, more preferably the ends of the two side flanks 16, 17 enclose an angle of approximately 90°.

For each pass-through opening 5, the corner connector 13 has a guide element 18 that has an insertion chamfer 19 on its upper side in the direction of the force of gravity, which chamfer is slightly beveled. In addition or alternatively, it can be provided that the guide element 18 also has an insertion chamfer 19 on its lower side in the direction of gravity.

The guide element 18 has a depression or recess 20 into which the holding pawl 8 is recessed when the holding pawl 8 is pivoted into the release position. In this case, the holding pawl 8 no longer projects beyond the side of the guide element facing the pass-through opening 5, such that a container 6 can easily pass through the pass-through opening 5 when the holding pawl 8 is in the release position. If, on the other hand, the holding pawl 8 is in the holding position (FIGS. 2 and 3), a container 6 can be set down on the holding pawl 8.

Figure 4:
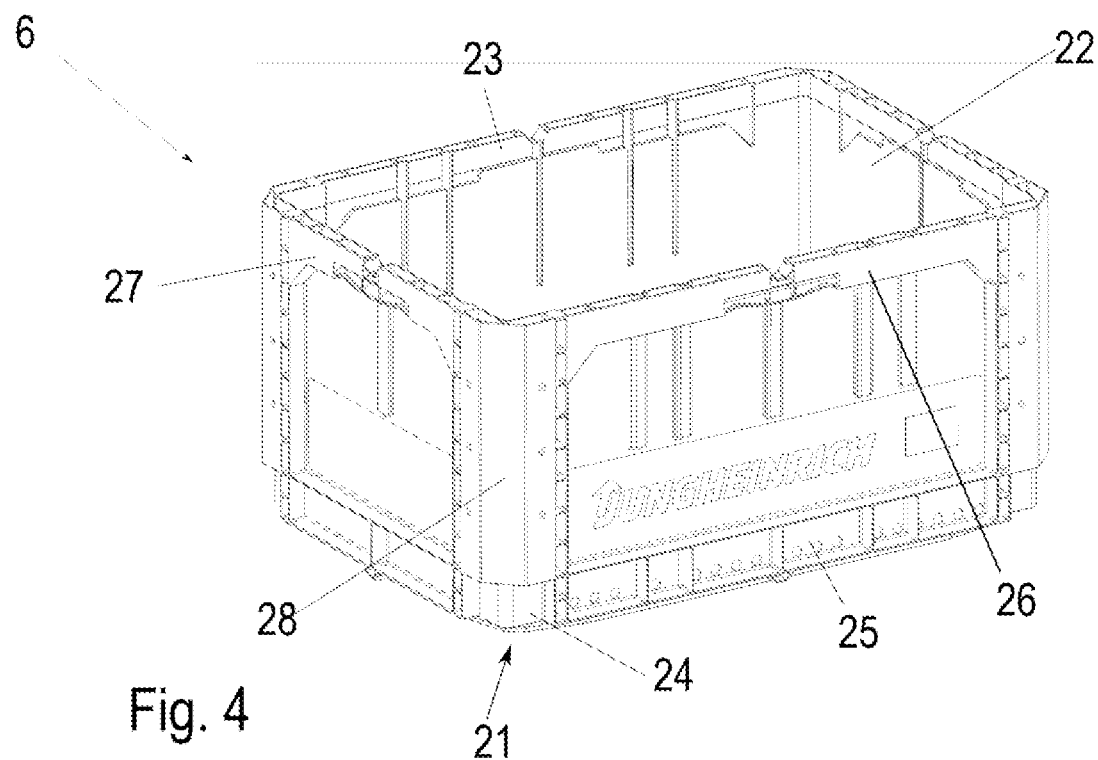
FIG. 4 is a container in perspective view.
Figure 5:
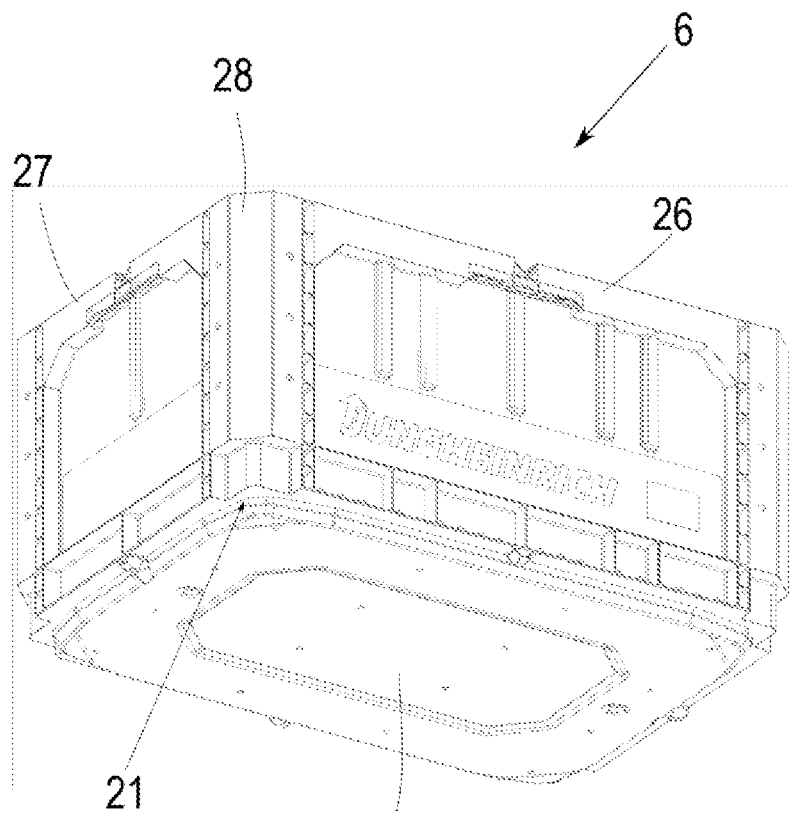
FIG. 5 is the container of FIG. 4 in perspective view from a different angle.

A container 6 that is particularly well-suited for this purpose is shown in FIGS. 4 and 5. The block stacking arrangement 1 has at least one such container that is arranged in a container receiving slot 2. The container 6 has a corner geometry 21. The shape of the cutout 15 is adapted to the shape of the corner geometry 21 of the container 6. In other words, the inner contour of the recess 15 corresponds to the outer contour of the corner geometry 21.

The container 6 has a container opening 22 that is surrounded by a container wall 23. The corner geometry 21 is arranged at the end of the container wall 23 facing away from the container opening 22. In the intended use, when the container opening 22 is arranged at the top in the direction of gravity, the corner geometry 21 will thus be located at the lower end of the container 6 in the direction of gravity.

The corner geometry 21 has an offset 24. The container 6 has a container bottom 25, wherein the corner geometry 21 extends in a direction of the container opening 22 at most as far as the container bottom 25.

The container wall 23 has a longitudinal side 26 and a transverse side 27, which are arranged essentially at right angles to one another. A connecting wall 28, which is angled with respect to both the longitudinal side 26 and the transverse side 27, wherein the angle in each case is a maximum of 150°, is located between the longitudinal side 26 and the transverse side 27. In the present case, the connecting wall 28 encloses an angle of 135° with both the longitudinal side 26 and the transverse side 27.

The guide element 18 has a contour that is adapted to the shape of the connecting wall 28. In simplified terms, the contour of the guide element 2 has lateral flanks 29, 30, which are essentially at right angles to one another and are then parallel to the longitudinal side 26 and the transverse side 27 when the container 6 is being guided through the pass-through opening 5, and an intermediate section 31, which is arranged at the angle at which the intermediate wall 28 is also arranged to the longitudinal side 26 and the transverse side 27.

The block stacking arrangement 1 has a plurality of posts 32, which rest on the frame 4. The posts 32 are arranged at corners of the container receiving slots 2 and are connected to one another by longitudinal struts 33 and transverse struts 34. The posts 32 are connected to the frame 4 via clamping elements 35, 36. Each post 32 rests on a corner connector 13 and is secured there.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A block stacking arrangement comprising:
   a plurality of container receiving slots;
   a loading space arranged in the direction of gravity below the container receiving slots;
   a pass-through opening between each of the container receiving slots and the loading space; and
   a holding device at the pass-through opening, which has at least one holding pawl that is pivotable between a holding position and a release position,
   wherein the holding pawl has a cutout that, in the holding position, is directed into the pass-through opening.

2. The block stacking arrangement according to claim 1, wherein the holding pawl has a pivot axis that encloses an angle of less than 75° with both a longitudinal direction and with a transverse direction of the pass-through opening.

3. The block stacking arrangement according to claim 1, wherein the cutout is formed to be V-shaped.

4. The block stacking arrangement according to claim 1, wherein the cutout has two side flanks, whose ends directed into the pass-through opening together enclose an angle in the range of 75° to 105°.

5. The block stacking arrangement according to claim 1, further comprising at least one container positionable within the block stacking arrangement and the cutout is adapted to the shape of a corner geometry of the container.

6. The block stacking arrangement according to claim 5, wherein the container has a container bottom, and the corner geometry extends in the direction of the container opening at most as far as the container bottom.

7. The block stacking arrangement according to claim 6, wherein the container bottom is located between the container opening and the corner geometry.

8. The block stacking arrangement according to claim 5, wherein the container has a container opening, which is surrounded by a container wall, and the corner geometry is arranged at an end of the container wall facing away from the container opening.

9. The block stacking arrangement according to claim 8, wherein the container wall has an offset in a region of the corner geometry.

10. The block stacking arrangement according to claim 8, wherein the container wall has a longitudinal side and a transverse side, which are arranged substantially at right angles to one another and are connected to one another by a connecting wall that is arranged between the corner geometry and the container opening and encloses in each case an angle of at most 150° with the longitudinal side and the transverse side.

11. The block stacking arrangement according to claim 10, further comprising a guide element, wherein the holding pawl in the release position is recessed in a depression of the guide element.

12. The block stacking arrangement according to claim 11, wherein the guide element has a contour that is adapted to the shape of the connecting wall.

13. The block stacking arrangement according to claim 11, wherein the guide element has an insertion chamfer on at least one of an upper side in the direction of gravity and/or a lower side in the direction of gravity.

* * * * *